(12) United States Patent
Sabeur et al.

(10) Patent No.: US 12,317,075 B2
(45) Date of Patent: May 27, 2025

(54) ARCHITECTURE FOR PROVIDING CELLULAR ROAMING SUPPORT

(71) Applicant: T-Mobile USA, Inc., Bellevue, WA (US)

(72) Inventors: Nassereddine Sabeur, Bellevue, WA (US); Joel Arends, Renton, WA (US); Saqib Badar, Bellevue, WA (US); Sabuhi Kiran Zaifuddin, Bellevue, WA (US); Raymond Thomas Ball, Seattle, WA (US); Shujaur Rehman Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/300,488

(22) Filed: Apr. 14, 2023

(65) Prior Publication Data

US 2023/0254693 A1   Aug. 10, 2023

Related U.S. Application Data

(62) Division of application No. 17/302,242, filed on Apr. 28, 2021, now Pat. No. 11,659,389.

(51) Int. Cl.
*H04W 12/06* (2021.01)
*H04W 4/14* (2009.01)
*H04W 8/06* (2009.01)
*H04W 60/00* (2009.01)

(52) U.S. Cl.
CPC ............. *H04W 12/06* (2013.01); *H04W 4/14* (2013.01); *H04W 8/06* (2013.01); *H04W 60/00* (2013.01)

(58) Field of Classification Search
CPC .......................... H04W 8/06; H04M 2203/158
USPC ........................................ 455/432.1; 370/225
See application file for complete search history.

(56) References Cited

U.S. PATENT DOCUMENTS

| | | | |
|---|---|---|---|
| 9,635,526 B2* | 4/2017 | McCann | H04W 60/00 |
| 2014/0113668 A1* | 4/2014 | Duan | H04W 4/14 |
| | | | 455/466 |
| 2015/0304836 A1* | 10/2015 | Anslot | H04W 4/70 |
| | | | 455/433 |
| 2016/0315978 A1 | 10/2016 | Jacobsohn et al. | |
| 2017/0093929 A1* | 3/2017 | Hockey | H04L 65/1053 |
| 2018/0234469 A1* | 8/2018 | Kim | H04W 60/00 |

* cited by examiner

*Primary Examiner* — Kiet M Doan
(74) *Attorney, Agent, or Firm* — Lee & Hayes, P.C.

(57) ABSTRACT

A network may include an International Serials Data System (ISDS) that is configured to register and determine an identity of a receiving or originating user equipment (UE) that has a home network that operates using a different format or standard than the current network. The ISDS may be configured to generate transmissions on behalf of the UE for registration and identification for outgoing and incoming voice or text messages using the format of both networks.

20 Claims, 10 Drawing Sheets

200

```
┌─────────────────────────────────────────────────────────────┐
│ RECEIVING, AT AN ISDS OF A VPLMN, A FIRST VoLTE TRANSMISSION│
│      ASSOCIATED WITH A VISITING CS-BASED USER EQUIPMENT     │
│                            202                              │
└─────────────────────────────────────────────────────────────┘
                              ↓
┌─────────────────────────────────────────────────────────────┐
│ GENERATING, BY THE ISDS, A FIRST CS TRANSMISSION BASED AT LEAST│
│           IN PART ON THE FIRST VoLTE TRANSMISSION           │
│                            204                              │
└─────────────────────────────────────────────────────────────┘
                              ↓
┌─────────────────────────────────────────────────────────────┐
│     SENDING, BY THE ISDS TO A HPLMN, THE FIRST CS TRANSMISSION│
│                            206                              │
└─────────────────────────────────────────────────────────────┘
                              ↓
┌─────────────────────────────────────────────────────────────┐
│  RECEIVING, AT THE ISDS, A SECOND CS TRANSMISSION ASSOCIATED│
│         WITH THE VISITING CS-BASED USER EQUIPMENT           │
│                            208                              │
└─────────────────────────────────────────────────────────────┘
                              ↓
┌─────────────────────────────────────────────────────────────┐
│ GENERATING, BY THE ISDS, A SECOND VoLTE TRANSMISSION BASED AT│
│         LEAST IN PART ON THE SECOND CS TRANSMISSION         │
│                            210                              │
└─────────────────────────────────────────────────────────────┘
                              ↓
┌─────────────────────────────────────────────────────────────┐
│ SENDING, BY THE ISDS TO ANOTHER COMPONENT OF THE VPLMN, THE │
│                 SECOND VoLTE TRANSMISSION                   │
│                            212                              │
└─────────────────────────────────────────────────────────────┘
                              ↓
┌─────────────────────────────────────────────────────────────┐
│   PREFORMING, BY THE ANOTHER COMPONENT OF THE VPLMN, AN     │
│   OPERATION ASSOCIATED WITH THE CS-BASED USER EQUIPMENT     │
│                            214                              │
└─────────────────────────────────────────────────────────────┘
```

FIG. 2

ARCHITECTURE FOR PROVIDING CELLULAR ROAMING SUPPORT

CROSS-REFERENCE TO RELATED APPLICATION

This application is a divisional of and claims priority to U.S. patent application Ser. No. 17/302,242 filed on Apr. 28, 2021, and entitled "ARCHITECTURE FOR PROVIDING CELLULAR ROAMING SUPPORT," the entirety of which is incorporated herein by reference.

BACKGROUND

Today, many networks provide roaming support to each other to enhance and increase a serviceable area for their network users. However, as network technologies have advanced some networks have lagged behind or failed to implement the newest network technologies. This growing divide between networks has resulted in some incompatibilities between networks that typically offer roaming support to each other's users. For example, many networks still rely on circuit switched (CS) systems while the more advanced systems have been upgraded to provided Voice over Long-Term Evolution (VoLTE) systems. Thus, an architecture for the VoLTE networks to provide roaming support for CS network users is desirable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is an example flow diagram showing an illustrative process associated with hosting a visiting CS-based user equipment on a VoLTE based visited public land mobile network, in accordance with some examples of the present disclosure.

DETAILED DESCRIPTION

Discussed herein are systems, architectures, and methods associated with VoLTE networks to provide registration, voice calling, text-message, and the like for roaming users that are currently associated with a CS network. For instance, many networks support roaming services for each other's users to enhance and increase a serviceable area associated with the individual networks. In some cases, a roaming partner's network may still rely on CS (or other legacy standards) based user equipment (UE) that may not be supported on more up-to-date VoLTE UEs. As such, the system, discussed herein, may be configured to register roaming VoLTE UEs to CS networks as a roaming user without maintaining dedicated CS network resources on the UE.

In some cases, the system may be configured to route mobile originating (MO) and mobile terminating (MT) calls, short message service (SMS) text-based messages, and the like between the VoLTE UEs roaming on the CS network with other UEs, as discussed below. In some cases, the CS network may act as a visited public land mobile network (VPLMN) to register, process calls and messages, and authenticate the roaming or visiting UE via a home location register (HLR) of a corresponding VoLTE home public land mobile network (HPLMN). A VPLMN is a public land mobile network that a user or UE may access as a visiting or roaming device when leaving the HPLMN associated with the user and/or UE.

In one implementation, the VPLMN may be configured with an International Switched Digital Service (ISDS) that is capable of receiving and transmitting requests from components of the VPLMN network on behalf of UEs located within a service area of the VPLMN using a first protocol, such as 4G, 5G, VoLTE and the like. The ISDS may also be configured to transmit and receive requests using various legacy protocols (e.g., CS network based requests) when registering visiting UEs, placing incoming or outgoing calls, and/or placing incoming or outgoing SMS messages. In this manner, the ISDS may be equipped with components to translate or otherwise process requests using multiple standards and/or protocols.

Figure 1:
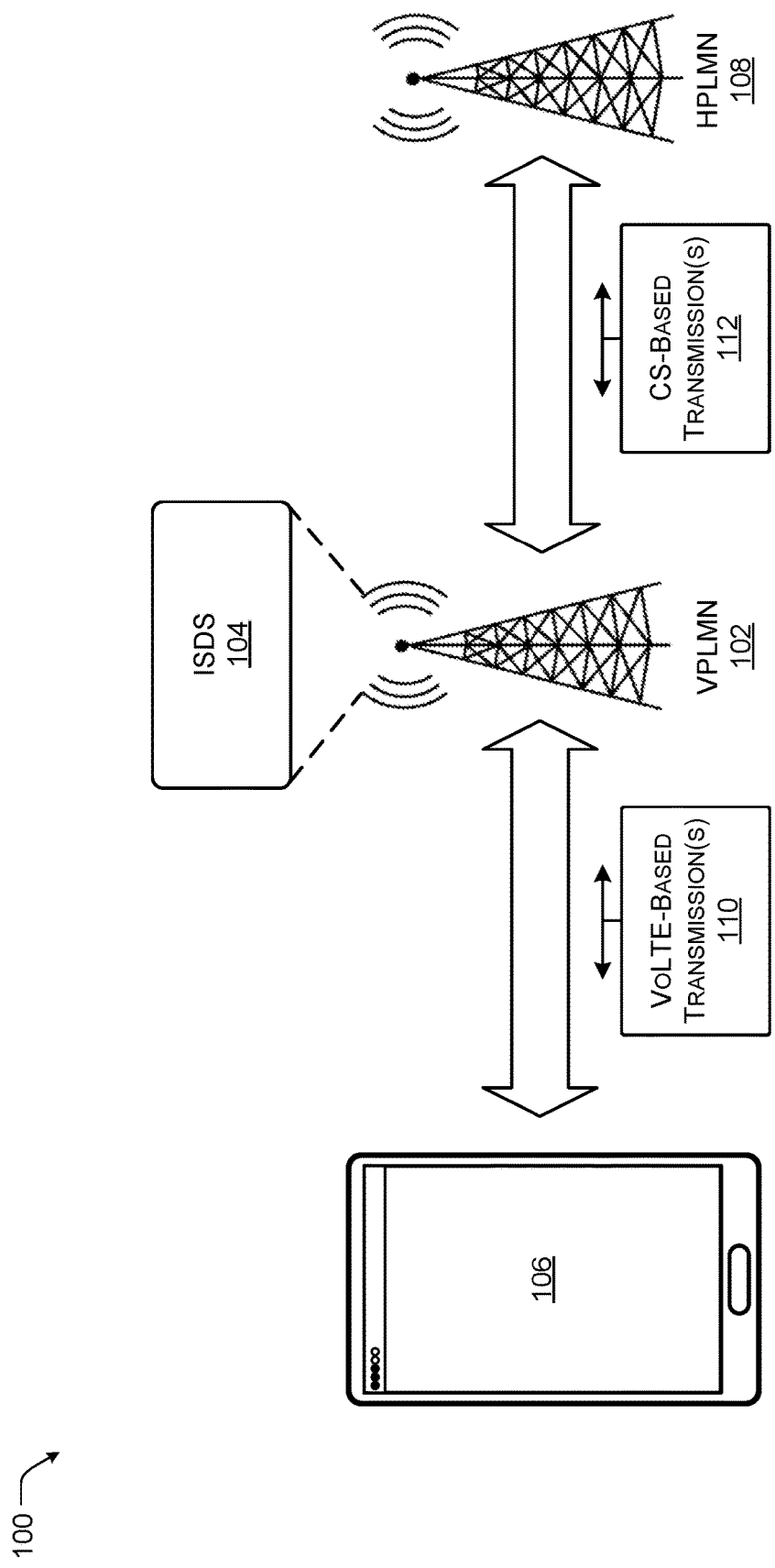
FIG. 1 is an example of a block diagram of a network equipped with an International Switched Digital Service configured to host vesting UEs associated with a CS-based home network, in accordance with some examples of the present disclosure.

FIG. 1 is an example 100 of a block diagram of a network 102 equipped with an ISDS 104 configured to host visiting UEs 106 associated with a CS-based home network 108, in accordance with some examples of the present disclosure. In some cases, the ISDS 104 may be configured to receive and transmit requests associated with the visiting UE 108 using the VoLTE standard. For example, the VoLTE-based transmissions 110 (e.g., confirmations, data, and requests) may include a registration request, an authentication request, a multimedia authentication request, registration confirmations, authentication confirmations, and the like. In some cases, the VoLTE standard transmissions 110 may be received from and sent to other components of the VPLMN 102, such as an Integrating-Call Session Control Function, Proxy-Call Session Control Function, a Serving-Call Session Control Function, and the like.

The ISDS 104 may also be configured to transmit and receive CS-based transmissions 112 (e.g., confirmations, data, and requests) from the HPLMN 108 associated with the visiting UE 106. For example, the ISDS 104 may be configured to translate or convert the VoLTE-based transmissions 110 into a CS-based transmissions 112 prior to transmitting to components of the HPLMN 108. The ISDS 104 may also be configured to translate or convert the CS-based transmissions 112 into a VoLTE-based transmissions 110 prior to transmitting to components of the VPLMN 102. For instance, as an illustrative example, the ISDS 104 may receive a VoLTE Multimedia Authentication Request and in response send a CS authentication information request to the HPLMN 108 to obtain, for instance, subscriber data associated with the visiting UE 106. In this example, the ISDS 104 may convert the subscriber data from the CS format into a VoLTE format to complete, for instance, a registration of the visiting UE 106 by other components of the VPLMN 102.

Figure 3:
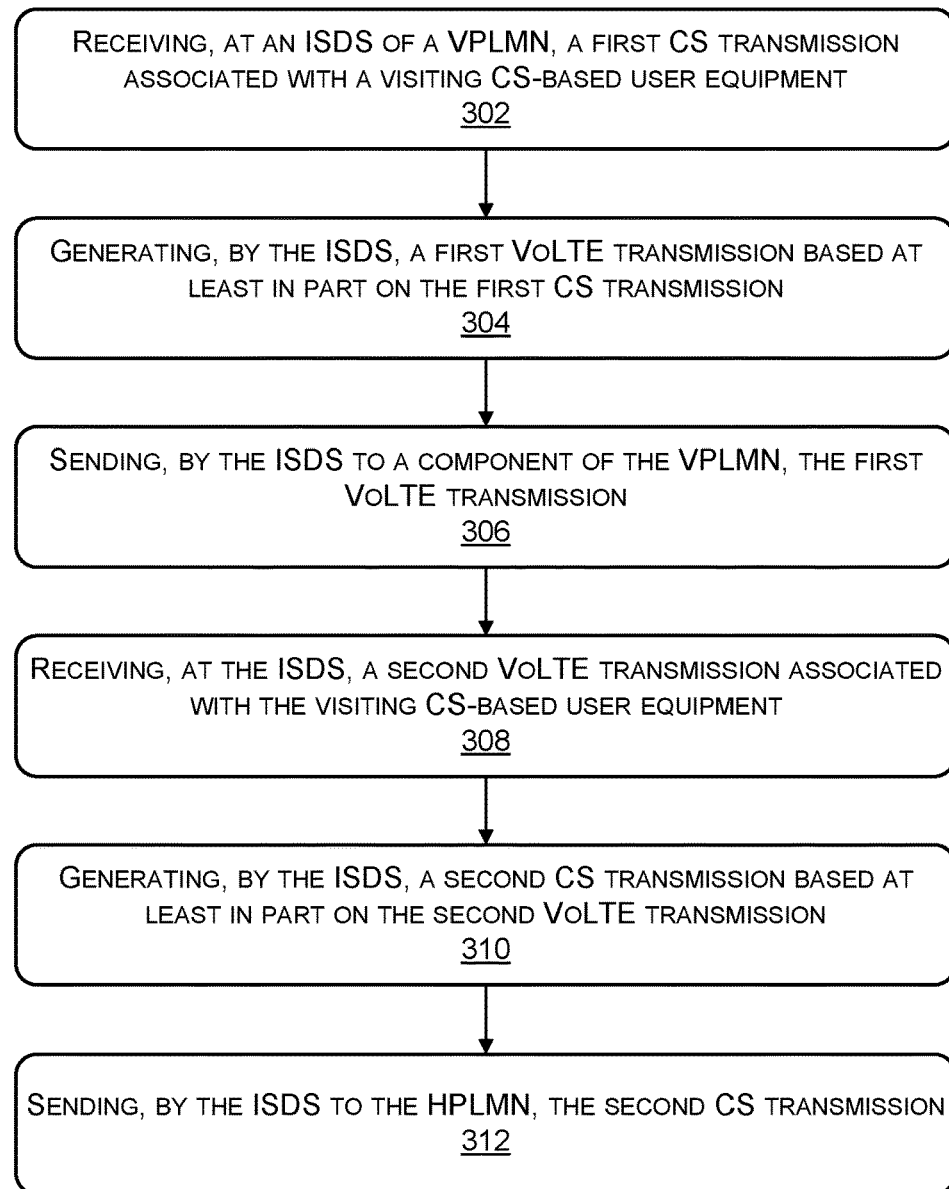
FIG. 3 is an example flow diagram showing an illustrative process associated with hosting a visiting CS-based user equipment on a VoLTE based visited public land mobile network, in accordance with some examples of the present disclosure.

FIGS. 2 and 3 are flow diagrams illustrating example processes associated with hosting visiting CS-based UEs on a VoLTE based network according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is an example flow diagram showing an illustrative process 200 associated with hosting a visiting CS-based user equipment on a VoLTE based VPLMN network, in accordance with some examples of the present disclosure. In some cases, a CS-based UE may attempt to register with the VoLTE based VPLMN and/or send a mobile originating call or text with respect to another UE.

At 202, an ISDS of the VPLMN may receive a first VoLTE transmission associated with the visiting CS-based UE. For example, the first VoLTE transmission may be a registration request, a Multimedia Authentication Request, an INVITE message, an SMS message, or the like. In these examples, the ISDS may obtain information associated with the CS-based UE from the home network of the CS-based UE (e.g., the CS-based UE's HPLMN).

At 204, the ISDS may generate a first CS transmission based at least in part on the first VoLTE transmission. For example, the ISDS may convert the CS transmission from a first format associated with the VPLMN to a second format associated with the HPLMN of the CS-based UE. In this manner, the VPLMN may operate using the first format while the ISDS is able to obtain information and data associated with the CS-based UE from the HPLMN using the second format.

At 206, the ISDS may send the first CS transmission to the HPLMN. For example, the first CS transmission may be an authorization information request, a location data request, an INVITE message, a mobile originating-forward short message (MO-FSM), and the like.

At 208, the ISDS may receive from the HPLMN a second CS transmission associated with the visiting CS-based UE. For example, the second CS transmission may be a location response, a mobile subscriber data or information, AKA vectors, INVITE response, MO-FSM response, and the like.

At 210, the ISDS may generate a second VoLTE transmission based at least in part on the second CS transmission. For example, the ISDS may convert or otherwise generate a second VoLTE transmission using data associated with the second CS based transmission. For example, an Inter-Working Function (IWF) associated with the ISDS 122 may build and/or store relevant profile information or data associated with the CS-based UE 102 received as mobile subscriber data from the HPLMN.

At 212, the ISDS may send the second VoLTE transmission to another component of the VPLMN and, at 214, the other component may perform an operation associated with the CS-based UE. In some cases, the other components may include an Integrating-Call Session Control Function, a Serving-Call Session Control Function, a Proxy-Call Session Control Function, and the like. For example, the Serving-Call Session Control Function may assign network resources (such as a server) to the CS-based UE in response to receiving the second VoLTE transmission.

FIG. 3 is an example flow diagram showing an illustrative process associated with hosting a visiting CS-based user equipment on a VoLTE based visited public land mobile network, in accordance with some examples of the present disclosure. In some cases, a CS-based UE may receive a mobile terminating call or text with respect to another UE.

At 302, an ISDS of the VPLMN may receive a first CS transmission associated with the visiting CS-based UE. For example, the first CS transmission may be a send routing information request, an Identity and Access Management Request, or the like. In these examples, the first CS transmission may be associated with a mobile terminating call or text message.

At 304, the ISDS may generate a first VoLTE transmission based at least in part on the first CS transmission. For example, the ISDS may convert the first VoLTE transmission from a first format associated with the HPLMN to a second format associated with the VPLMN. In this manner, the VPLMN may operate using the second format while the ISDS is able to obtain information and data associated with the CS-based UE from the HPLMN using the first format.

At 306, the ISDS may send the first VoLTE transmission to a component of the VPLMN. For example, the first VoLTE transmission may be a Mobile Terminating Forward short message that the ISDS may convert to a VoLTE SIP message for forwarding to the visiting UE via, for example, Serving-Call Session Control Function and/or a Proxy-Call Session Control Function.

At 308, the ISDS may receive from the component of the VPLMN a second VoLTE transmission associated with the visiting CS-based UE. For example, the second VoLTE transmission may be an acknowledgement of the text message or the like.

At 210, the ISDS may generate a second CS transmission based at least in part on the second VoLTE transmission. For example, the ISDS may convert or otherwise generate a second CS transmission using data associated with the second VoLTE transmission. The second VoLTE transmission may then be sent or otherwise provided to the HPLMN associated with the visiting UE.

Figure 4:
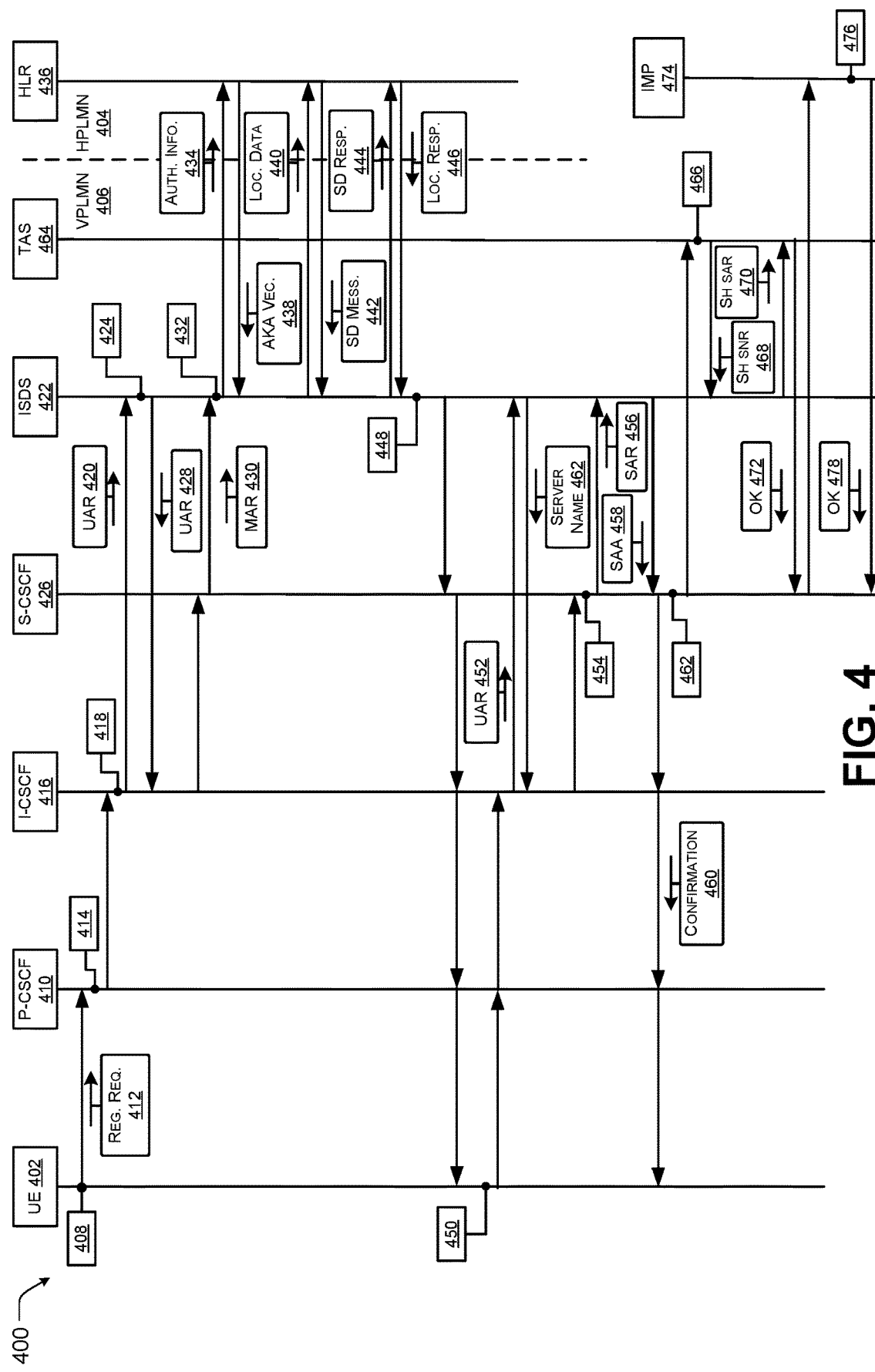
FIG. 4 is an example of a data flow diagram for registering a VoLTE user equipment to a CS network, in accordance with some examples of the present disclosure.

FIG. 4 is an example of a data flow diagram for registering a CS user equipment 402 to a VoLTE network, in accordance with some examples of the present disclosure. For example, the UE 406 may be associated with a CS-based HPLMN 404 but may be attempting to register as a roaming or visiting device on a VoLTE-based VPLMN 406. In other words, the UE 402 may be at a location that is outside of the network coverage provided by the HPLMN 404 but within the network coverage area of the VPLMN 406.

Initially, at 408, the UE 402 may discover a Proxy-Call Session Control Function (P-CSCF) 410 associated with the VPLMN 406. The UE 402 may then transmit or send a registration request 412 to the detected P-CSCF 410. The P-CSCF 410 may act as a first point of contact between the UE 402 and the VPLMN 406. The registration request 412 may include a Uniform Resource Identifier (URI) associated with the UE 402 to assist the P-CSCF 410 in processing the registration request.

At 414, the P-CSCF 410 may select an Integrating-Call Session Control Function (I-CSCF) 416 for the UE 402 based on a home domain indicated by the URI in the registration request 412. For example, the P-CSCF 410 may select a Mobile Network Code (MNC), a Mobile Country Code (MCC), or other identifiers for the HPLMN 404 associated with UE's 402. In some cases, the P-CSCF 410 may configure an associated Domain Name Server (DNS) to return an address associated with the I-CSCF 416 to avoid changes to a Unified Access Gateway (UAG) associated with the UE 402. The I-CSCF 416 may assist with routing requests to an appropriate service function, such as Serving-Call Session Control Function (S-CSCF) 426 discussed below.

At 418, the I-CSCF 416 selected by the P-CSCF 410 may receive the registration request 408 or an indication of the registration request 412. The I-CSCF 416 may select a Home Subscribers Server (HSS) for the UE 402 based on the MNC and/or MCC associated with the HPLMN 404. In other examples, the I-CSCF 416 may select the HSS for the UE 402 based on an Internet protocol multimedia private identity (IMPI/IMPU) and/or a domain name indicated by the URI associated with the UE 402. The I-CSCF 416 may then generate and forward a unified authentication request (UAR) 420 associated with the UE 402 to an International Switched Digital Service (ISDS) 422.

At 424, the ISDS 422 may check to determine if the UE 402 is an authorized roaming partner device and confirm or determine if the S-CSCF 426 for the UE 402 is assigned. If the UE 402 passes the roaming partner check and the S-CSCF 426 is assigned, the ISDS 422 may return a Unified Authentication Accept (UAA) message 428 to the I-CSCF 416. The I-CSCF 416 may also send or forward the registration request 412 or an indication of the registration request 412 to the assigned S-CSCF 426, which in response sends a Multimedia Authentication Request (MAR) 430 to the ISDS 422.

At 432, the ISDS 422 may initiate an authentication process with the HPLMN 404. For example, the ISDS 422 may send authentication information 434 to a Home Location Register (HLR) 436 associated with the HPLMN 404. As discussed above, the ISDS 422 may receive the MAR 430 as a VoLTE based transmission and send the authentication information 434 as a CS-based transmission compatible or readable by the HLR 436 of the HPLMN 404. The HLR 436 may be a database that contains or stores various data about mobile subscribers of a mobile network, such as the mobile numbers, services and whether a number has been ported to another network, and the like.

The HLR 436 may return also known as (AKA) vectors 438 for the UE 402 to the ISDS 422. Again, the AKA vectors 438 may be transmitted as a CS-based transmission that is received and processed by the ISDS 422. The ISDS 422 may then send updated location data 440 associated with the UE 402 to the HLR 436 of the HPLMN 404 as another CS-based transmission. In some cases, the ISDS 422 and the HLR 436 may also exchange subscriber data (SD) via a CS-based message 442 and a CS response 444. The HLR 436 may also return a CS-based confirmation or response 446 associated with or acknowledging the updated location data 440. In one example, the ISDS 422 may translate a diameter of the CS-based message to a diameter associated with a media access plan or protocol (MAP) readable by the VPLMN 406. The ISDS 422 may also forward the MAP to the HLR 436 and store the user profile or UE profile data.

At 448, an Inter-Working Function (IWF) associated with the ISDS 422 may build and/or store relevant profile information or data associated with the UE 402 in a format associated with the VPLMN 406 and received from the HLR 436 of the HPLMN 404. The S-CSCF 426 may then return either an unauthorized message and/or the aka vectors information 438 to the UE 402, the I-CSCF 416, and/or the P-CSCF 410, as illustrated.

At 450, the UE 402 may send a message (such as UAR 452) to the ISDS 422. The ISDS 422 may, in response, provide a server-name 462 to the I-CSCF 416, with which the ISDS 422 may complete the registration process with the VPLMN 406, as shown. For example, at 454, if the authentication is successful, the S-CSCF 426 provides a Server-Assignment-Request (SAR) 456 to the ISDS 422 and a Server-Assignment-Answer (SAA) 458 is returned by the ISDS 122. Upon receipt of the SAA 458, the S-CSCF 426 may send a confirmation 460 of the registration back to the UE 402.

At 462, the S-CSCF 426 may execute an iFC process and the UE 402 may be registered with a Telephone Application Server (TAS) 464 associated with the VPLMN 406. In some cases, at 466, the TAS 464 may select a Home Subscriber Server (HSS) for the UE 402 based on the MCC, MNC, the IMPI, the IMPU, the domain name indicated by the URI associated with the UE 402, a combination thereof, or the like. The TAS 464 may then send a diameter associate with a Sub network router (Sh-SNR) 468 to the ISDS 422. In response, the ISDS 422 may provide a diameter associated with the Systems Network Architecture (SNA) 470 to the TAS 464. The TAS 464 may then send an OK or approval message 472 to the S-CSCF 126. The S-CSCF 426 may then register the UE 402 with an Interface Message Processor (IMP) 474.

At 476, the IMP 474 may query a contract data requirement list (CRDL) to determine if a Uniform Network Resource Identifier (UNRI) is set or otherwise configured for the UE 402. In some cases, the TAS 474 may also write or store registering data. Once, the CRDL configuration is confirmed, the TAS 464 may return an OK or approval message 478 to the S-CSCF 426 and the UE 402 is fully registered with the VPLMN 406.

Figure 5:
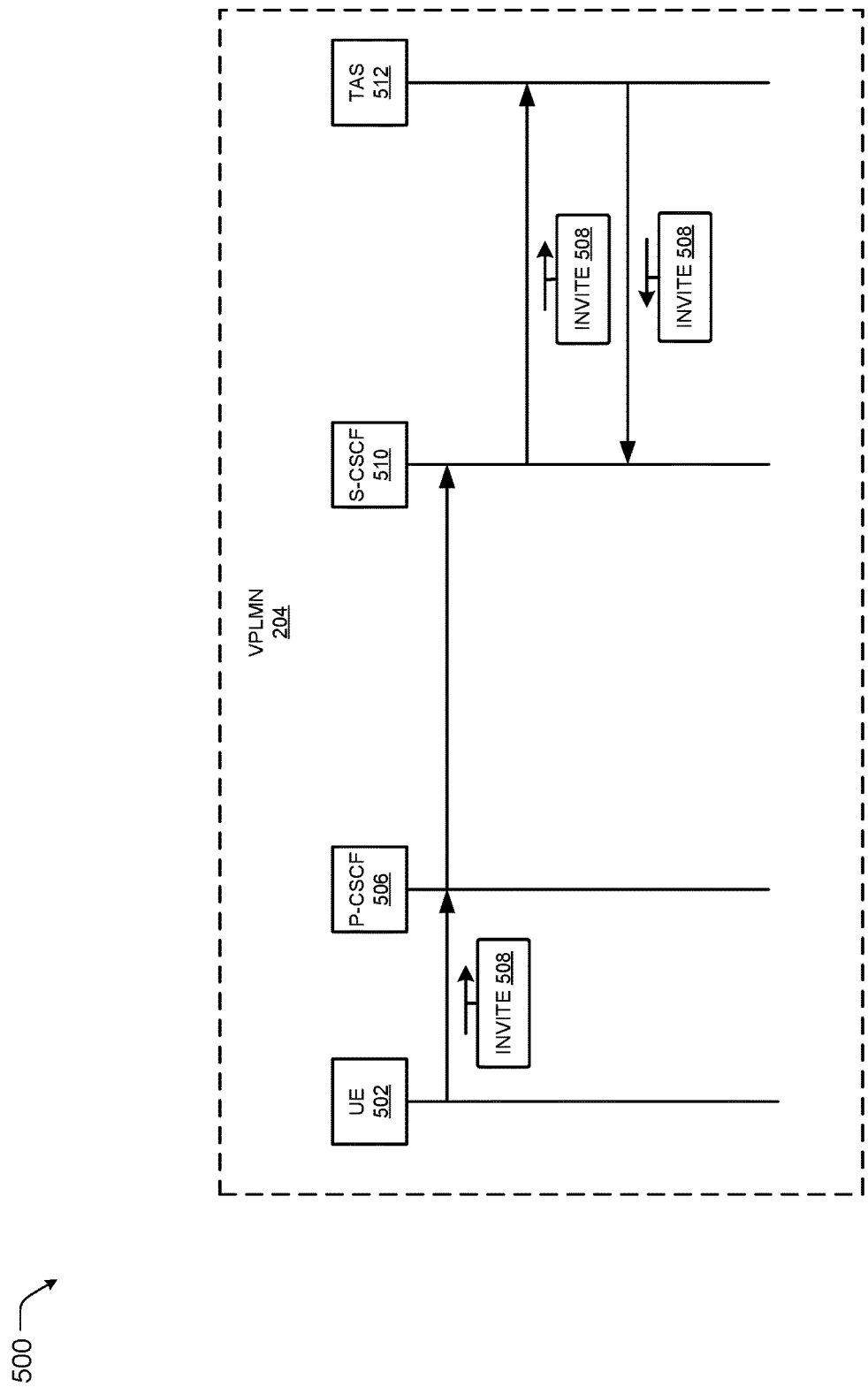
FIG. 5 is an example of a data flow diagram associated with routing a mobile originating call from a visiting user equipment over a visited public land mobile network, in accordance with some examples of the present disclosure.

FIG. 5 is an example of a data flow diagram 500 associated with routing a mobile originating call (MOC) from a visiting UE 502 over a VPLMN 504, in accordance with some examples of the present disclosure. Initially, the VPLMN 504 receives an inbound MOC from a UE 502. The inbound MOC may be routed in a similar manner as to the VoLTE calls. The MOC may be received at a P-CSCF 506 in the form of an INVITE message 508. The P-CSCF 506 may forward the INVITE message 508 to a S-CSCF 510 and the S-CSCF 510 may execute the iFC process. The INVITE message 508 may then be received by a TAS 512. The TAS 512 may execute the originating services and the S-CSCF 510 may route the call to a mobile terminating (MT) UE (not shown) in a traditional manner.

Figure 6:
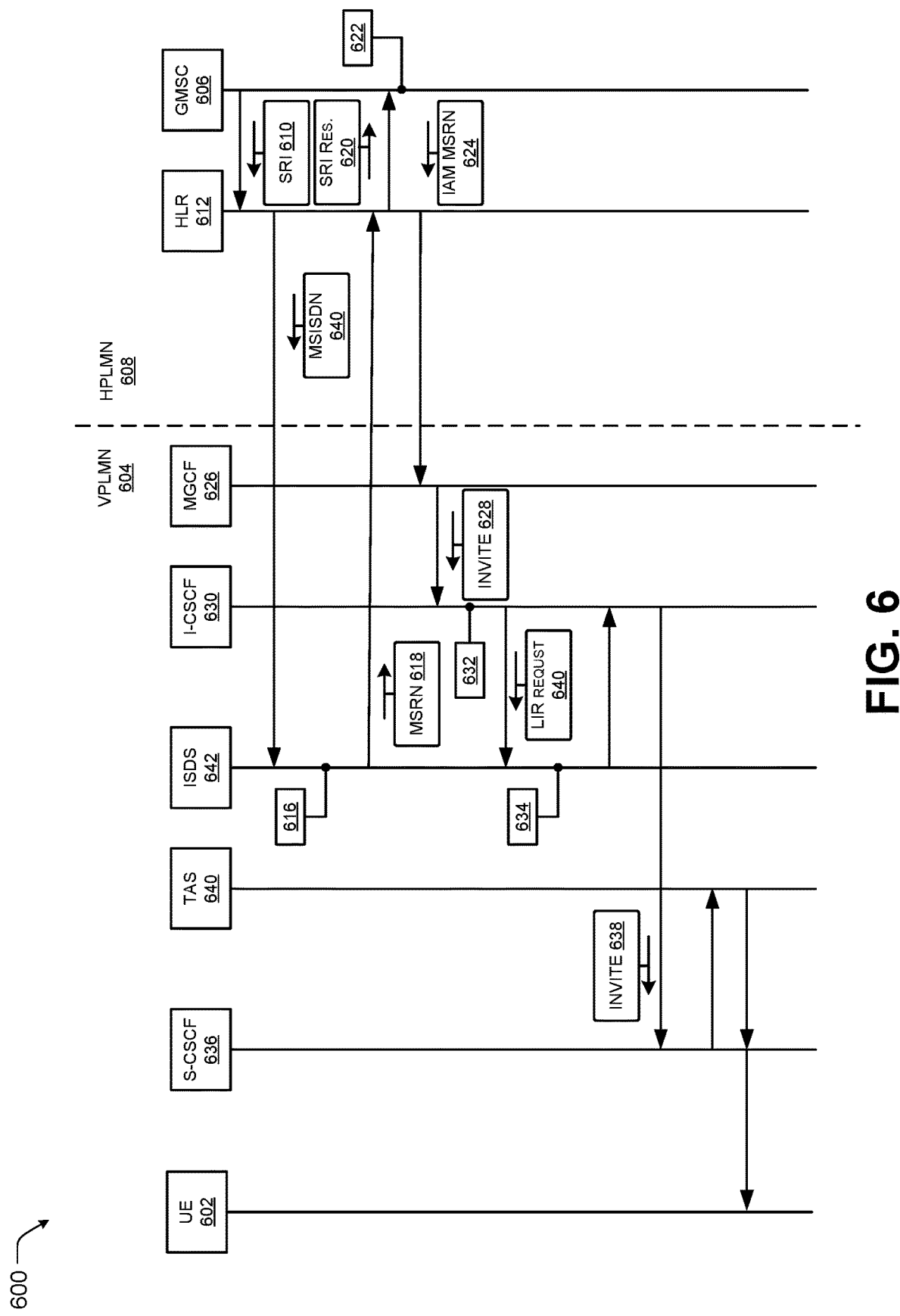
FIG. 6 is an example of a data flow diagram associated with routing a mobile terminating call for a visiting user equipment over a visited public land mobile network, in accordance with some examples of the present disclosure.

FIG. 6 is an example of a data flow diagram 600 associated with routing a mobile terminating call (MTC) for a visiting UE 602 over a VPLMN 604, in accordance with some examples of the present disclosure. Initially, a Gateway Mobile Switching Center (GMSC) 606 associated with a HPLMN 608 sends a send routing information (SRI) request 608 to a HLR 612 of the HPLMN 608. In response, the HLR 612 sends a Mobile Subscriber Integrated Services Digital Network Number (MSISDN) 614 to an ISDS 642 associated with the VPLMN 604.

At 616, the ISDS 642 may allocate, store, and/or check a Mobile Station Roaming Number (MSRN) against the MSISDN 614 received from the HLR 612. If the ISDS 642 identifies a match, the ISDS 642 may return a MSRN 618 to the HLR 612 associated with the HPLMN 608 and the HLR 612 may send an SRI response 620 to the GMSC 606. In this example, the MSISDN 614 and the MSRN 618 may be sent and received in a first format (e.g., a CS based transmission) associated with the HPLMN 608.

At 622, the GMSC 606 may generate an Identity and Access Management (IAM) MSRN request 624 and forward to a Media Gateway Controller Function (MGCF) 626 associated with the VPLMN 604. The MGCF 626 may translate the IAM MSRN request 624 to an INVITE message 628. The INVITE message 628 is provided to a I-CSCF 630 associated with the VPLMN 604.

At 632, the I-CSCF 630 may select an IWF for use with the MTC and send a Local Internet Registry (LIR) request 640 (640 is used twice as LIR request and TAS, here and in the PDF) to the ISDS 642. The LIR request 640 may be in a second format (e.g., a VoLTE based format) associated with the VPLMN 604. At 634, the LIR request 640 indicates the MSRN 618, and the IWF determines the MSISDN 614 associated with the MRSN 618, returns a custom AVP, and assigns a S-CSCF 636 to the MOC. The Server Name associated with the S-CSCF 636 and the MSISDN 614 are then sent to the I-CSCF 630 which sends an INVITE 638 to the S-CSCF 636, thereby routing the MTC to the S-CSCF 636. The INVITE 638 may indicate the MSISDN 614. The S-CSCF 636 may apply initial filter criteria to route the MTC to a TAS 644. The TAS 644 may then perform terminating services and route the MTC to the UE 602 via a corresponding P-CSCF 642, as shown.

Figure 7:
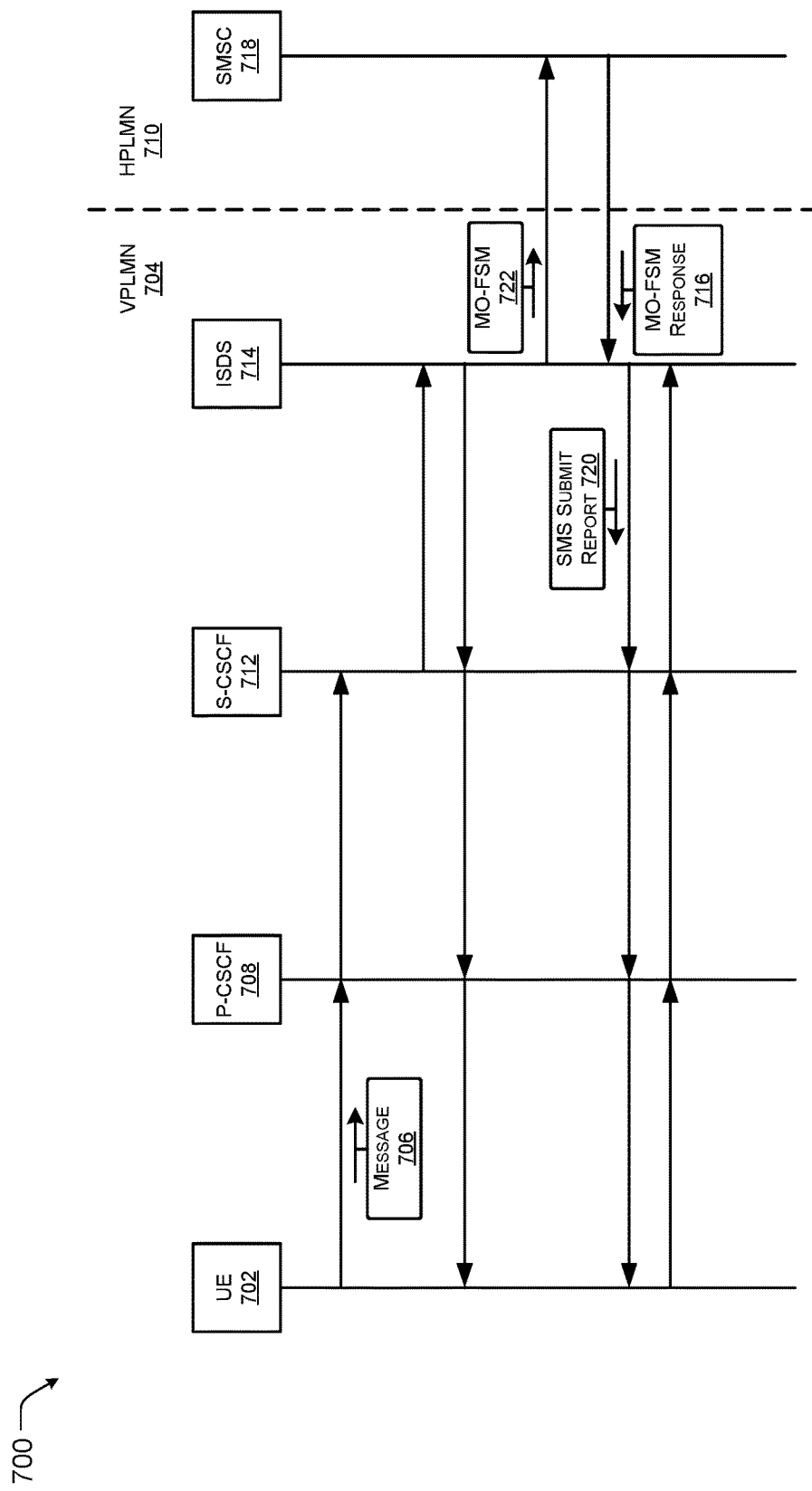
FIG. 7 is an example of a data flow diagram associated with routing a mobile originating short-message-service from a visiting user equipment over a visited public land mobile network, in accordance with some examples of the present disclosure.

FIG. 7 is an example of a data flow diagram 700 associated with routing a mobile originating short-message-service (SMS) from a visiting UE 702 over a VPLMN 704, in accordance with some examples of the present disclosure. In the illustrated example, the UE 702 may send a message 706 to the P-CSCF 708 of the VPLMN 704. The message 706 may include a SMS-SUBMIT request (in a first format associated with the VPLMN 704) and include a R-URI, an indication of a HPLMN 710 associated with the SMS message, a SMS control address, and the like. The P-CSCF 708 may forward the message 706 to a S-CSCF 412. The S-CSCF 712 may execute an iFC process and send the message to an ISDS 714 in the first format associated with the VPLMN 704, as illustrated. The ISDS 714 may then convert the message 706 to a second format associated with the HPLMN 710. For example, the first format may be a VoLTE based transmission format and the second format may be a CS based transmission format. The ISDS 714 may then send a CS based MO-FSM 722 to the SMSC 718 of the HPLMN 710.

The ISDS 714 may receive a CS based MO-FSM response 716 (e.g., in the second format) from the HPLMN 710. For example, the SMSC 718 may return a CS based MO-FSM response 716 indicating a successful delivery of the SMS message. The ISDS 714 may then convert the CS based MO-FSM response 716 to a VoLTE SMS submit report 720 (e.g., in the first format). The ISDS 714 may then return SMS submit report 720 to the UE 702 via the S-CSCF 712 and/or the P-CSCF 708, as shown. Finally, the UE 702 may then acknowledge the report with the ISDS 714.

Figure 8:
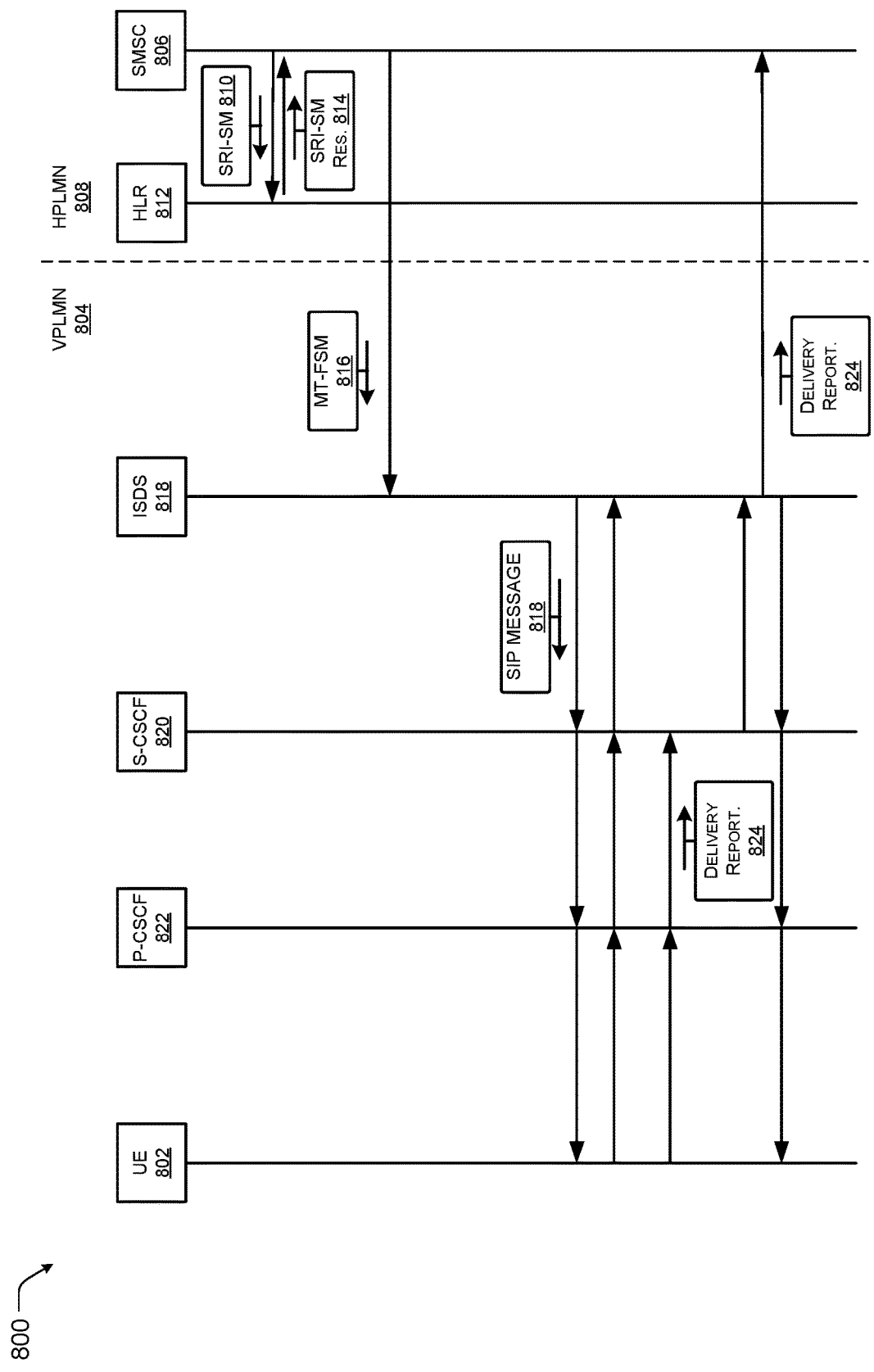
FIG. 8 is an example of a data flow diagram associated with routing a mobile terminating short-message-service from a visiting user equipment over a visited public land mobile network, in accordance with some examples of the present disclosure.

FIG. 8 is an example of a data flow diagram 800 associated with routing a MT SMS from a visiting UE 802 over a VPLMN 804, in accordance with some examples of the present disclosure. In the currently illustrated example, an SMSC 806 of a HPLMN 808 originating the SMS message may transmit a send-routing information for a short message (SRI-SM) 810 to an HLR 812 associated with the HPLMN 808. The HLR 812 may then return a SRI-SM response 814 to the SMSC 806. The SRI-SM response 814 including a visitor location register (VLR) of the UE 802.

The SMSC 806 may then transmit a Mobile Terminating Forward short message (MT-FSM) 816 to an ISDS 818 associated with the VPLMN 804 currently servicing the UE 802. The MT-FSM 816 may be in a first format, such as a CS based transmission format associated with the HPLMN 810. The ISDS 818 may convert the MT-FSM 816 to a SIP MESSAGE in a second format then deliver the SIP MESSAGE 818 to the UE 802 via a S-CSCF 820 and a P-CSCF 822, as shown. The second format may be a VoLTE based transmission format and associated with the VPLMN 804. In some cases, the UE 802 may acknowledge a receipt of the SIP MESSAGE 818 by sending an OK response to the ISDS 818. The UE 802 may also send a MESSAGE with a delivery report 824 to the S-CSCF 820. The S-CSCF 820 may report back to the SMSC 806 via the ISDS 818, as illustrated.

Again, as discussed above, the communication with the components of the HPLMN 810 may be in the first format associated with the HPLMN 810 (e.g., a CS based transmission format) and the communication within the VPLMN 804 may be in the second format (e.g., a VoLTE based transmission format). In this example, the ISDS 818 is responsible for converting or generating transmissions, request, reports, and the like in the appropriate format for each of the components. In this manner, the ISDS 818 acts to translate the transmissions to a diameter or standard associated with the responsible network 804 or 810.

Figure 9:
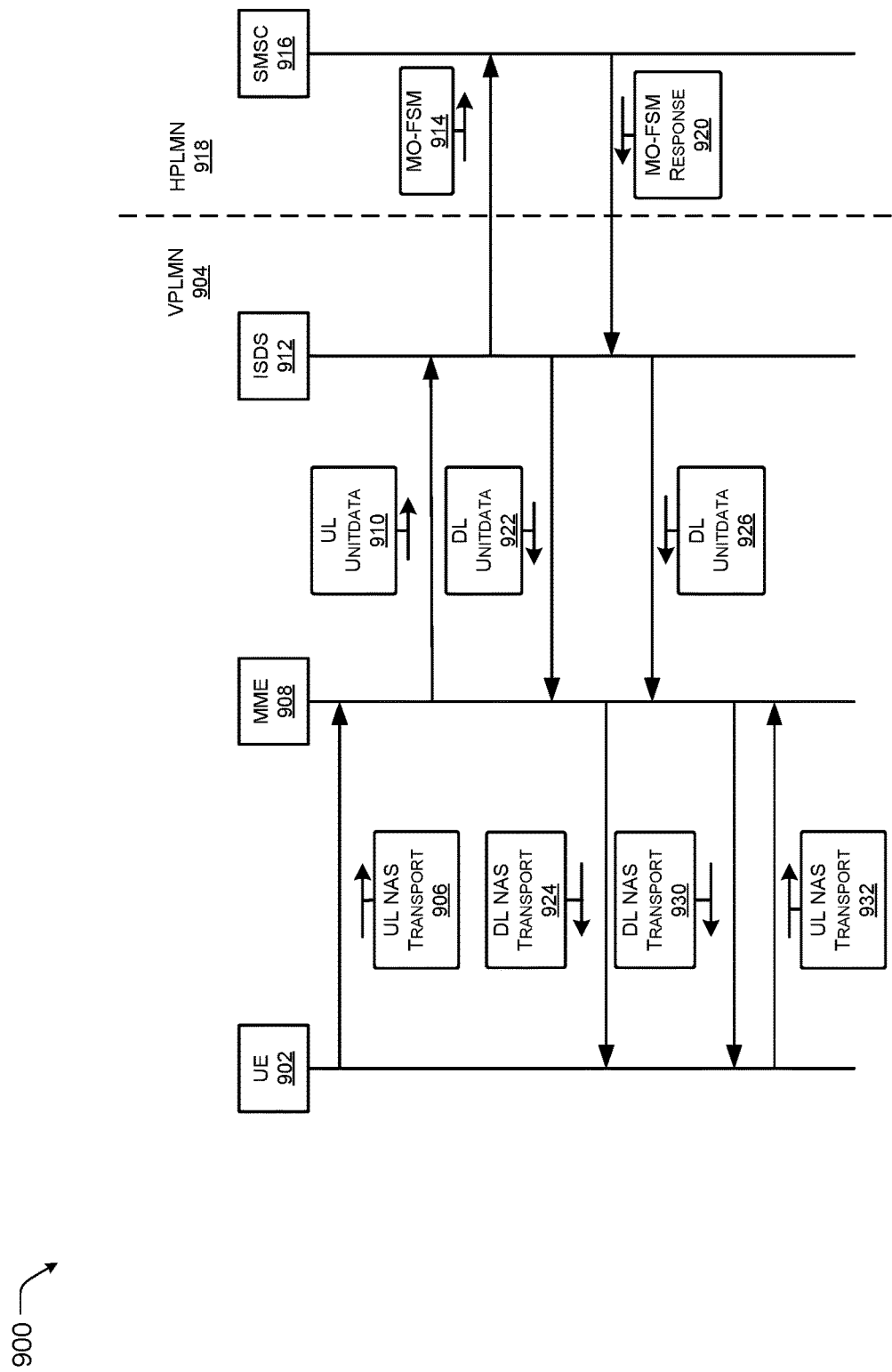
FIG. 9 is another example of a data flow diagram associated with routing a mobile originating short-message-service from a visiting user equipment over a visited public land mobile network, in accordance with some examples of the present disclosure.

FIG. 9 is another example of a data flow diagram 900 associated with routing a MO SMS from a visiting UE 902 over a VLPMN 904, in accordance with some examples of the present disclosure. In this example, the UE 902 may initiate an SMS message using a Standard Global Service (SGs). For instance, the UE 902 may send via an uplink (UL) Non-Access Stratum (NAS) transport 906 to a mobility management entity (MME) 908 associated with the VPLMN 904. The transport 906 may include the SMS data. The MME 908 may translate data associated with the UL NAS transport 906 to UL Unitdata 910. The UL Unitdata 910 is transmitted to an ISDS 912 associated with the VPLMN 904. The ISDS 912 may also send an acknowledgment associated with the MO-FSM 914 back to the MME 908 as a downlink Unitdata 922 and the MME 908 may forward to the UE 902 via a DL NAS transport 924.

The ISDS 912 converts the UL Unitdata 910 from a first format associated with the VPLMN 904 to a MO-FSM 914 in a second format associated with the HPLMN 918 and sends to SMSC 916 associated with an HPLMN 618. For example, the first format may be a VoLTE format and the second format may be a CS format. The SMSC 916 may process the MO-FSM 914 and transmit a MO-FSM response 920 back to the ISDS 912. The ISDS 912 may convert the MO-FSM response 920 to a DL Unitdata 926 and sends the DL Unitdata 926 to the MME 908 over the SGs. The MME 908 then converts the DL Unitdata 926 to a DL NAS transport 930 and send the DL NAS transport 930 to the UE 902. In some cases, the UE 902 may provide a UL NAS transport 932 back to the MME 908 acknowledging receipt of the DL NAS transport 930.

Figure 10:
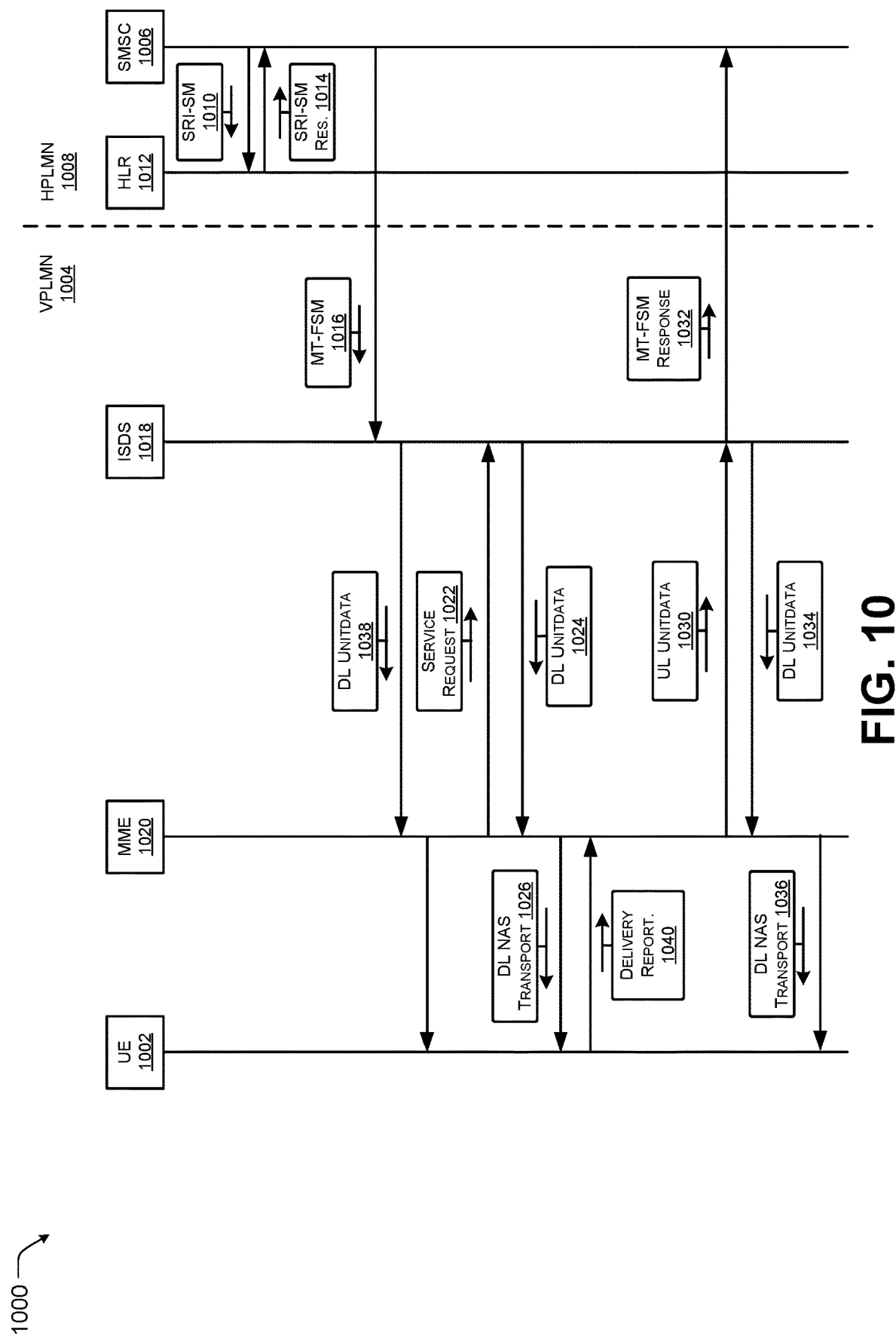
FIG. 10 is another example of a data flow diagram associated with routing a mobile terminating short-message-service from a visiting user equipment over a visited public land mobile network, in accordance with some examples of the present disclosure.

FIG. 10 is another example of a data flow diagram 1000 associated with routing a MT SMS from a visiting UE 1002 over a VLPMN 1004, in accordance with some examples of the present disclosure. In this example, the UE 1002 may receive an SMS message using a SGs. In this example, an SMSC 1006 of a HPLMN 1008 originating the SMS message may transmit a SRI-SM 1010 to an HLR 1012 associated with the HPLMN 1008. The HLR 1012 may then return a SRI-SM response 1014 to the SMSC 1006 the SRI-SM response 1014 including a visitor location register (VLR) of the UE 1002.

The SMSC 1006 may then transmit a MT-FSM 1016 to an ISDS 1018 associated with the VPLMN 1004 currently servicing the UE 1002. The ISDS 1018 may convert the MT-FSM 1016 in a format associated with the HPLMN 1008 to a DL Unitdata 1038 in a format associated with the VPLMN 1004. The DL Unitdata 1038 may then be provided to the UE 1002 via an MME 1020. The MME 1020 may initiate a service request 1022 to cause the ISDS 1018 to provide DL Unitdata 1024. The MME 1020 may then convert the DL Unitdata 1024 to a DL NAS transport 1026 which is transmitted to the UE 1002.

The UE 1002 may then initiate a delivery report 1040 to provide back to the SMSC 1006 of the HPLMN 1008. The MME 1020 may convert the UL NAS transport 1028 to a UL Unitdata 1030 which is provided to the ISDS 1018. The ISDS 1018 may then cover the UL Unitdata 1030 to a MT-FSM response 1032. The MS-FSM response 1032 is then sent to the SMSC 1006. The ISDS 1018 may also respond to the UE 1002 with a final acknowledgement message that may be provided via the MME 1020 as DL Unitdata 1034 and DL NAS transport 1036, as illustrated.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, at a visited public land mobile network (VPLMN), a message associated with a short-message-service (SMS) from a visiting user equipment (UE), the message including a SMS-SUBMIT request and a Uniform Resource Identifier (URI);
   routing the message to an international serials data system (ISDS);
   generating, by the ISDS, a mobile originating forward short message (MO-SMS) in a format associated with a second network;
   transmitting the MO-SMS to a short message service center associated with the second network; and
   receiving, at the ISDS, a MO-FSM response from the short message service center, the response indicating a successful delivery of the SMS message.

2. The computer-implemented method as claim 1 recites, further comprising sending, by the ISDS, an accept message to the UE in response to receiving the message from a serving-call session control function (C-CSCF).

3. The computer-implemented method as claim 1 recites, further comprising sending, from the ISDS, an SMS Submit report to the UE.

4. The computer-implemented method as claim 1 recites, wherein the message is provided to the VPLMN as part of an uplink non-access stratum transport.

5. The computer-implemented method as claim 1 recites, wherein:
   the message is received at a serving-call session control function (C-CSCF) of the VPLMN; and
   the message is routed to the ISDS by the S-CSCF.

6. The computer-implemented method as claim 1 recites, wherein:
   the message is received at a mobility management entity (MME) of the VPLMN; and
   the message is routed to the ISDS by the MME as an uplink unit data transport.

7. The computer-implemented method as claim 1 recites, wherein the message includes an indication of the second network and a SMS control address.

8. A system comprising:
   one or more processors;
   a memory communicatively coupled to the one or more processors, the memory storing computer-readable instructions that, when executed by the one or more processors, cause the one or more processors to perform operations comprising:
   receiving, at a visited voice over long-term evolution (VOLTE) public land mobile network, a message associated with a short-message-service (SMS) from a visiting user equipment (UE) associated with a circuit switched (CS) network, the message including a SMS-SUBMIT request and a Uniform Resource Identifier (URI);
   routing the message to an international serials data system (ISDS);
   generating, by the ISDS, a mobile originating forward short message (MO-SMS) in a format associated with the CS network; and
   transmitting the MO-SMS to a short message service center associated with the CS network.

9. The system of claim 8, wherein the operations further comprise sending, by the ISDS, an accept message to the UE in response to receiving the message from a serving-call session control function (C-CSCF).

10. The system of claim 8, wherein the operations further comprise sending, from the ISDS, an SMS Submit report to the UE.

11. The system of claim 8, wherein the message is provided to the land mobile network as part of an uplink non-access stratum transport.

12. The system of claim 8, wherein:
the message is received at a serving-call session control function (C-SCF) of the land mobile network; and
the message is routed to the ISDS by the S-CSCF.

13. The system of claim 8, wherein:
the message is received at a mobility management entity (MME) of the land mobile network; and
the message is routed to the ISDS by the MME as an uplink unit data transport.

14. The system of claim 8, wherein the message includes an indication of the second network and a SMS control address.

15. The system of claim 8, wherein the operations further comprise receiving, at the ISDS, a MO-FSM response from the short message service center, the response indicating a successful delivery of the SMS message.

16. One or more non-transitory computer-readable media storing instructions which when executed by one or more processors, causes the one or more processors to perform operations comprising:
receiving, at a visited public land mobile network, a message associated with a short-message-service (SMS) from a roaming user equipment (UE) associated with a circuit switched (CS) home public land mobile network, the message including a SMS-SUBMIT request and a Uniform Resource Identifier (URI) and the home public land network different than the visited public land mobile network;
routing the message to an international serials data system (ISDS);
generating, by the ISDS, a CS mobile originating forward short message (MO-SMS) in a format associated with the CS home public land mobile network; and
transmitting the MO-SMS to a short message service center associated with the CS home public land mobile network.

17. The one or more non-transitory computer-readable media of claim 16, wherein the operations further comprise sending, by the ISDS, an accept message to the UE in response to receiving the message from a serving-call session control function (C-CSCF).

18. The one or more non-transitory computer-readable media of claim 16, wherein:
the message is received at a serving-call session control function (C-CSCF) of the land mobile network; and
the message is routed to the ISDS by the S-CSCF.

19. The one or more non-transitory computer-readable media of claim 16, wherein the operations further comprise receiving, at the ISDS, a MO-FSM response from the short message service center, the response indicating a successful delivery of the SMS message.

20. The one or more non-transitory computer-readable media of claim 16, wherein the operations further comprise sending, from the ISDS, an SMS Submit report to the UE.

* * * * *